(12) United States Patent
van Gogh et al.

(10) Patent No.: US 9,116,780 B2
(45) Date of Patent: Aug. 25, 2015

(54) METHOD FOR MODELING SOURCE CODE HAVING CODE SEGMENTS THAT LACK SOURCE LOCATION

(71) Applicant: GOOGLE INC., Mountain View, CA (US)

(72) Inventors: Jeffrey van Gogh, Mountain View, CA (US); Stephen F. Yegge, Mountain View, CA (US); Michael Joseph Fromberger, Mountain View, CA (US); Amin Shali, Mountain View, CA (US); Gregory Scott West, Mountain View, CA (US); James Anthony Dennett, Mountain View, CA (US); Lasse Espeholt, Aarhus N (DK); Ronald Aaron Braunstein, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 104 days.

(21) Appl. No.: 13/760,641

(22) Filed: Feb. 6, 2013

(65) Prior Publication Data
US 2014/0223415 A1 Aug. 7, 2014

(51) Int. Cl.
*G06F 9/44* (2006.01)

(52) U.S. Cl.
CPC ... *G06F 8/73* (2013.01); *G06F 8/75* (2013.01)

(58) Field of Classification Search
None
See application file for complete search history.

(56) References Cited

U.S. PATENT DOCUMENTS

| 5,345,380 | A | * | 9/1994 | Babson et al. | 700/90 |
| 5,596,703 | A | * | 1/1997 | Eick et al. | 715/700 |
| 8,015,554 | B2 | * | 9/2011 | Varma | 717/137 |
| 2007/0226708 | A1 | | 9/2007 | Varma | |
| 2009/0313613 | A1 | * | 12/2009 | Ben-Artzi et al. | 717/137 |
| 2010/0275180 | A1 | * | 10/2010 | Alex | 717/106 |
| 2011/0302563 | A1 | * | 12/2011 | Li | 717/143 |

FOREIGN PATENT DOCUMENTS

JP 2011-113147 A 6/2011

OTHER PUBLICATIONS

Search Report for International Application No. PCT/US2014/014591 mailed Jul. 2, 2014.
Written Opinion of the International Searching Authority for International Application No. PCT/US2014/014591 mailed Jul. 2, 2014.

* cited by examiner

*Primary Examiner* — Jason Mitchell
(74) *Attorney, Agent, or Firm* — Birch, Stewart, Kolasch & Birch, LLP

(57) ABSTRACT

A system and method for modeling code segments that do not have a location is disclosed. Source code may be indexed and modeled in a data graph with nodes representing code elements and edges representing relationships between nodes. However, some code elements may be hidden or implicit and therefore may lack location information. In these cases, code figments are created and represented as nodes in the graph. Figment nodes may be specially designated so that the figment nodes may be easily distinguished from real source code nodes. The graph is then updated to include location information for the code figments in the nodes that interact with the hidden or implicit code. The data graph may then be provided to a user or as a service to be used by coding tools.

21 Claims, 11 Drawing Sheets

```
1: /* file stdio.h */
2: int printf(const char *format, ...);
```

FIG. 1a

```
1: /* file hello.c */
2: #include stdio.h
3: main(){
4:   printf("hello world");
5: }
```

FIG. 1b

METHOD FOR MODELING SOURCE CODE HAVING CODE SEGMENTS THAT LACK SOURCE LOCATION

BACKGROUND

Software developers write source code in several different programming languages. Each programming language has distinct syntax and semantics. Coding tools including code browsers, Integrated Development Environments (IDES), and historical analysis tools need to be able to understand source code languages in order for these tools to be useful to the software developers. Most tools are good at representing one or two languages, but have difficulty supporting other languages. In order to have adequate tool support across all programming languages, there should be a single code model that can be used by all tools. Representing semantics and syntax of source code for all languages requires a complex data model and a service that understand each language's nuances. The data model and service also need to be able to index elements and display relationships among elements from any programming language and across languages.

SUMMARY

This specification describes technologies relating to data modeling in general, and specifically to methods and systems for modeling code segments that lack source locations.

In general, one aspect of the subject matter described in this specification can be embodied in a system and method for modeling source code. An exemplary system includes: one or more processing devices and one or more storage devices storing instructions that, when executed by the one or more processing devices, cause the one or more processing devices to receive source code including code segments that do not have a source location; index the received source code; create a data model from the indexed source code that includes a plurality of nodes representing code elements and a plurality of edges for relationships between elements; determine the source location to be associated with each node; responsive to recognizing one of the code segments as a hidden or implicit code segment, create a figment representation for the code segment; and assign the created figment as the source location associated with the code segment's node. An exemplary method includes: receiving source code including code segments that do not have a source location; indexing the received source code; creating a data model from the indexed source code that includes a plurality of nodes representing code elements and a plurality of edges for relationships between elements; determining the source location to be associated with each node; responsive to recognizing one of the code segments as a hidden or implicit code segment, creating a figment representation for the code segment; and assigning the created figment as the source location associated with the code segment's node. A second exemplary method for using a data model that represents a code segment that does not have a source location includes: requesting a data model for code which includes a code segment that does not have a source location; receiving the requested data model including a figment representation of the code segment that does not have a source location; and optionally displaying the figment representation of the code segment to an end user.

These and other embodiments can optionally include one or more of the following features: a figment node may be specially annotated to distinguish the node from other nodes in the date model; the data model may be provided to a user; the data model may be provided via an application programming interface (API); the data model may be provided to a user via a user interface; the data model may be provided to a user via command line code; the figment representation's content may be valid code syntax; the figment representation's content models code behavior, but does not represent valid code syntax; there may be an edge between a node for source code which uses the hidden or implicit code segment and a node representing the created figment; the data model may contain metadata about the figment representation; the metadata may be used to show or hide the figment representation from the end user; the metadata may be used to display information that a code segment is a figment; the metadata may be used to display information that a code segment contains a figment; and a data model may be requested using an application programming interface.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1*a* is a block diagram illustrating an exemplary code segment.

FIG. 1*b* is a block diagram illustrating an exemplary code segment.

DETAILED DESCRIPTION

Figure 2:
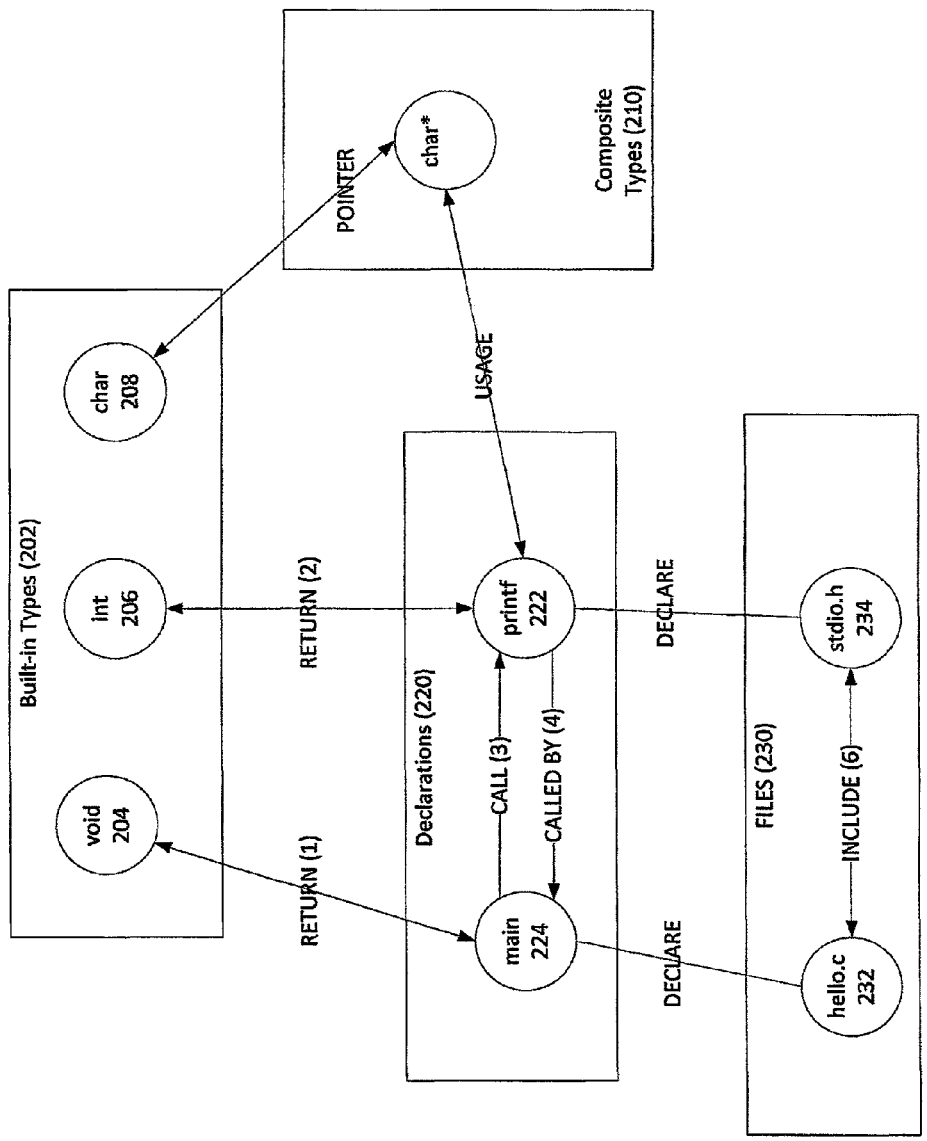
FIG. 2 is a block diagram illustrating a data model for the code segments defined in FIGS. 1*a* and 1*b*.

An exemplary data model and service provides a language-neutral, canonical, representation of source code and compiler metadata. The model represents source code as a data graph. A data graph is a data structure that stores data and shows relationships among data using a finite collection of points, called nodes, and lines, called edges. Relationships within a graph are represented by connecting nodes with each other using edges as depicted in FIG. 2.

In order to create a data graph model from source code, the source code must be translated to a set of nodes and edges that form a graph. A convenient method that leads to high levels of accuracy is to reuse existing compilers for that source code. A compiler may be provided with indexers that extract data from the compiler to construct nodes and edges for the data graph model.

FIGS. 1a and 1b show two example snippets of source code files which can be used together to print out the words, "hello world." File "stdio.h" (105) in FIG. 1a contains a definition of the function "printf" on line 2 which takes in a pointer to a string, "format," as an argument and writes the string pointed by "format" to the standard output. In FIG. 1b, file "hello.c" (110) includes the "stdio.h" file on line 2 and uses the definition of "printf" from "stdio.h" on line 4 in a function called "main" (line 3) to write the string, "hello world" to standard output. A data model may represent the source code snippets as a graph similar to the graph depicted in FIG. 2. FIG. 2 shows the two files, "hello.c" (232) and "stdio.h," (234) as nodes in the graph with an "includes/included by" relationship (6) represented by a bidirectional edge between the two nodes. The node representing the file,"hello.c,"(232) is connected to a node representing the function, "main," (224) by a bi-directional edge depicting a "declares/declared by" relationship between the two nodes. The node representing the file, "stdio.h" (234) is connected to the node for "printf" (222) by a "declares/declared by" relationship edge. Since "printf" is called by "main" in the source code, the node representing "main" (224) is connected to the node representing "printf" (222) by a "calls/called by" relationship mirrored edge (3, 41. In the graph, both the node for "main" (224) and the node for "printf" (222) have relationships to the built-in types which they return (1, 2). "Main" (224) has a void (204) return (1) and "printf" returns (2) an "int" (206).

As discussed above, nodes are created to represent segments of the source code. Nodes can represent several different types of elements such as: built-in types; parameterized types; composite types (210); pointer types; declarations of symbols; user-defined types; references; methods, method calls, fields, assignments, comments, inline documentation and files. Each node may contain certain information including: a globally unique identifier for the node; a kind of element; a display name; a location for the element in the source code; the element's modifiers; dimensions; and snippets of code that exist around the element in the source code. A node could be, but is not limited to, one of several kinds such as: unresolved, comment, lost, namespace, package, module, class, structure, interface, enumeration, enumeration constant, function, method, constructor, field, local, parameter, variable, property, boolean, character (208), string, regular expression, integer, float, fixed number, rational number, complex number, big number, object, instance, file, directory, symbolic link, diagnostic, pointer, reference, alias, null, void, unit, variatic type, parameter type, variable type, specialization type, symbol, name, value, usage, array, set, map, list, tuple, and union.

Edges may represent relationships among elements in the data model. These edges may be bi-directional, meaning that each edge from a first node to a second node has a mirrored edge from the second node to the first node. There may be several different kinds of edge pairs including: extends/extended by; implements/implemented by; overrides/overridden by; inherits/inherited by; declares/declared by; captures/captured by; base type/composing type; has type/is type of; return type/returned by; call/called at; instantiate/instantiated at; reference/referenced at; has property/property of; has declaration/declaration of; has definition/definition of; has input/consumed by; has output/produced by; generates/generated by; restricted to/allowed access to; usage context/enclosed usage; annotated with/annotation of; parent/child; and throws/thrown by.

In some instances a data graph stores semantic information about elements that have no source location because some pieces of code are hidden or implicit and do not have a physical location. Examples of code that does not have a location include: default constructors; macro expansions; template instantiations; statically indexable runtime objects; implicit function arguments; lambda expansions, document comments, constant folding, and generated code.

Hidden or implicit code segments may be referenced, used, or otherwise linked to other parts of the source code. It is problematic for these code segments to lack a location. If a user wants to traverse the data graph from a place in the source code that calls one of the above-mentioned code segments to the segment, the usual "jump" function does not work since there is no actual physical place in the source code for the hidden or implicit code segment, and therefore no location in the data graph for the element. Hidden or implicit code segments may also not have a representation that is valid syntax in the source language.

In certain cases where there is hidden or implicit code, customary data models often show messages that tell users that there is no source location available. Other customary models alternatively synthesize a location that points to a related piece of source code. Although this synthesizing approach may be good enough for a software developer to understand the code, the approach is not usable for static analysis tools. For example, in the case of default constructors, if the user clicks on an instantiation of the constructor, a data graph model may take the user to the declaration of the class instead. Most users, if they clicked on a default constructor, would understand why a data graph model would take them to the declaration that brought the the implicit default constructor into existence. However, a static analysis tool may not have this special knowledge. Therefore, if a static analysis tool were to refactor the source code when there is hidden or implicit code, the tool would most likely rewrite the code into code that is invalid. Another customary model includes building custom user interfaces, but this model requires that each kind of hidden/implicit data have its own way of storing metadata as well as custom UI.

An exemplary data graph model does not skip or synthesize alternative locations to hidden or implicit code segments. Instead, the exemplary model exposes representations of the hidden/implicit code segments by creating code figments. An exemplary method recognizes hidden/implicit code segments within source code. Source "figments" are then generated for the hidden/implicit code. These figments do not need to be actual compiled code or even valid syntax in the source language. However, the figments should represent the hidden or implicit code in a meaningful way. It is preferable that the figments have syntax as close as possible to the original source language so that the end user can understand the figment.

Figure 9:
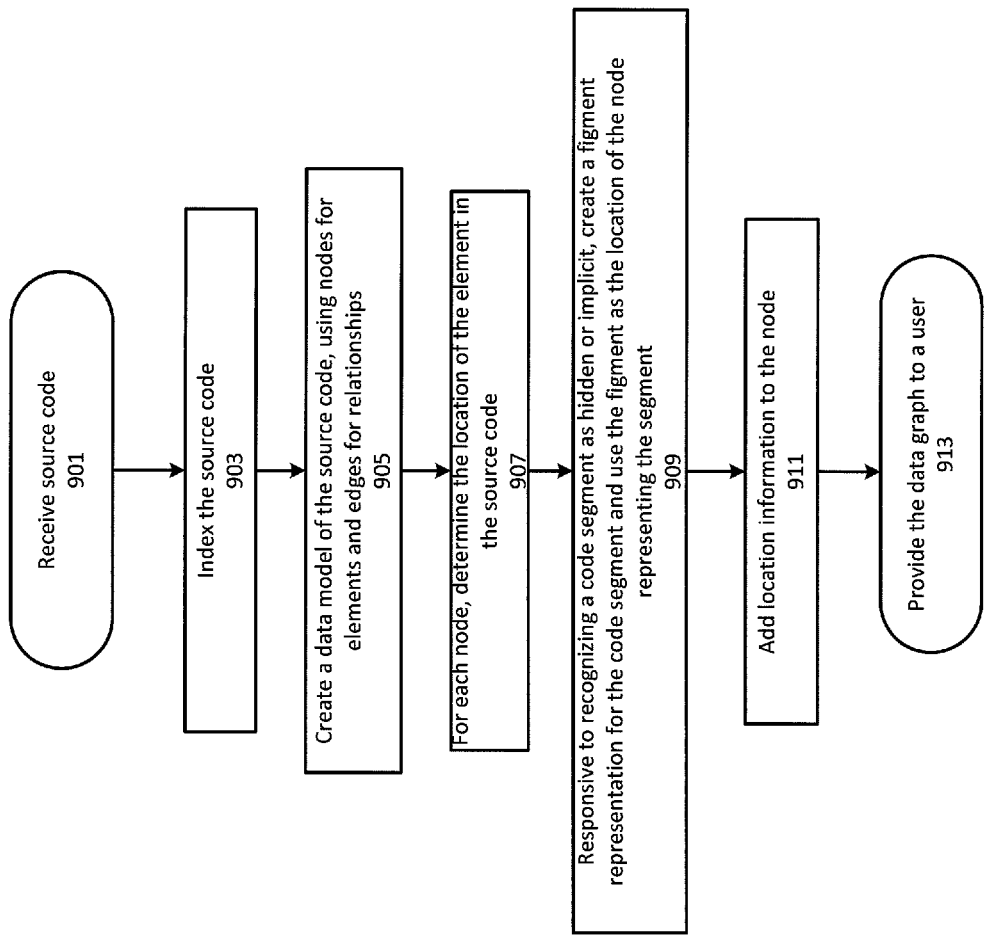
FIG. 9 is a flow diagram of an exemplary method for creating code figments representing hidden and/or implicit code.

An exemplary method for modeling code segments that do not have a source location begins with receiving source code (901) as illustrated in FIG. 9. The source code should then be indexed (903). A data model may be created from the indexed source code using nodes to represent elements and edges to represent relationships between nodes (905). For each node, the source location may be determined (907). If the code segment represented by the node is hidden or implicit, a code figment representation of the code segment may be created (909). The figment location may then be used to model the location in any node that represents any aspect of the hidden or implicit code (911). Figment nodes may also be specially annotated to distinguish figment nodes from real nodes. The data may then be provided to an end user (913) via a user interface, an application programming interface, or some other mechanism.

Figure 3:
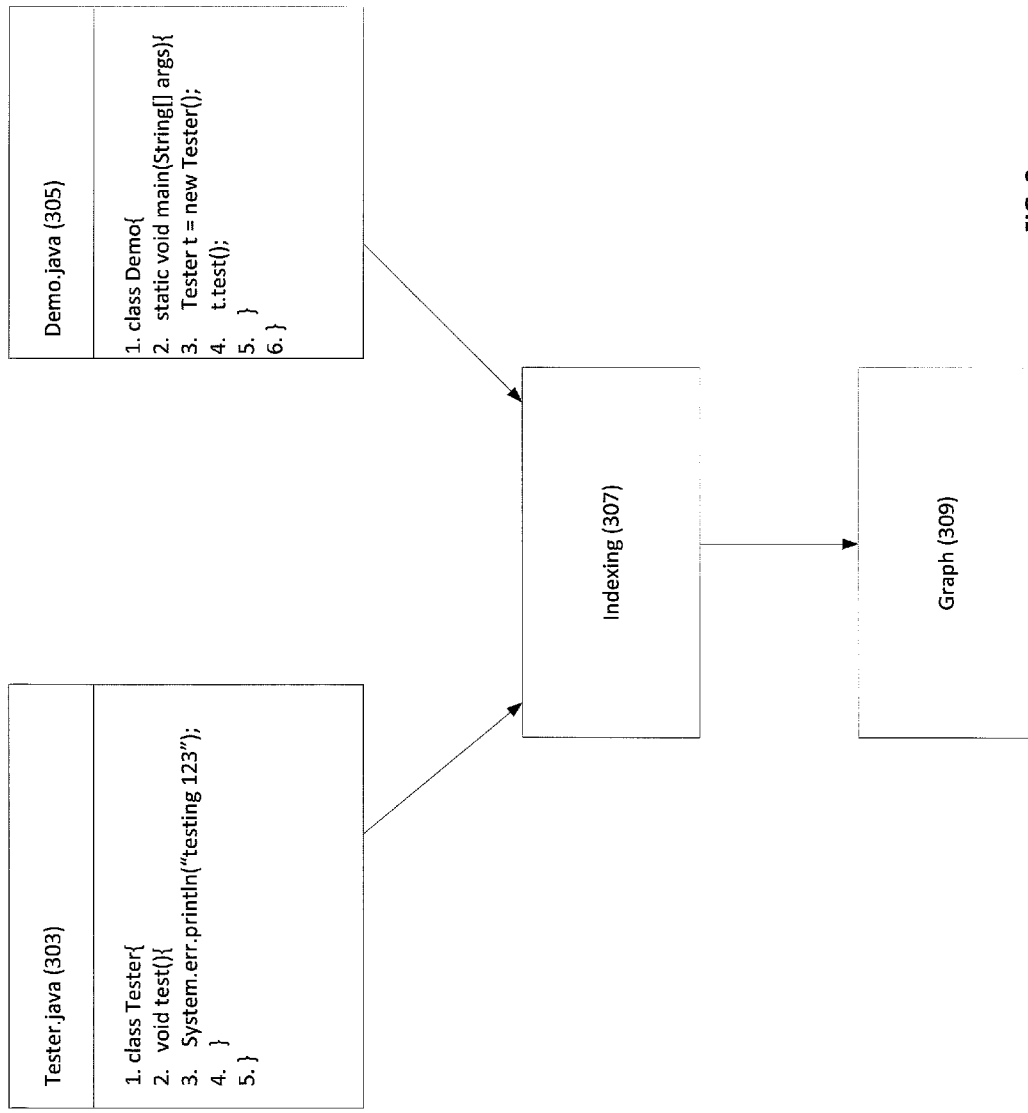
FIG. 3 is a block diagram illustrating an exemplary process of indexing and graphing two code segments.

FIG. 3 illustrates the process in which an exemplary service indexes (307) two java files to create an exemplary data graph model (309). Demo.java( ) (305) has a call on line 3 to a default constructor of the Tester class. The Tester class is defined in Tester.java (303), but there is no explicit definition of the default constructor in Tester.java (303). Therefore, there is no source code for this constructor and a compiler may emit a default implementation as a placeholder for the code.

Figure 4:
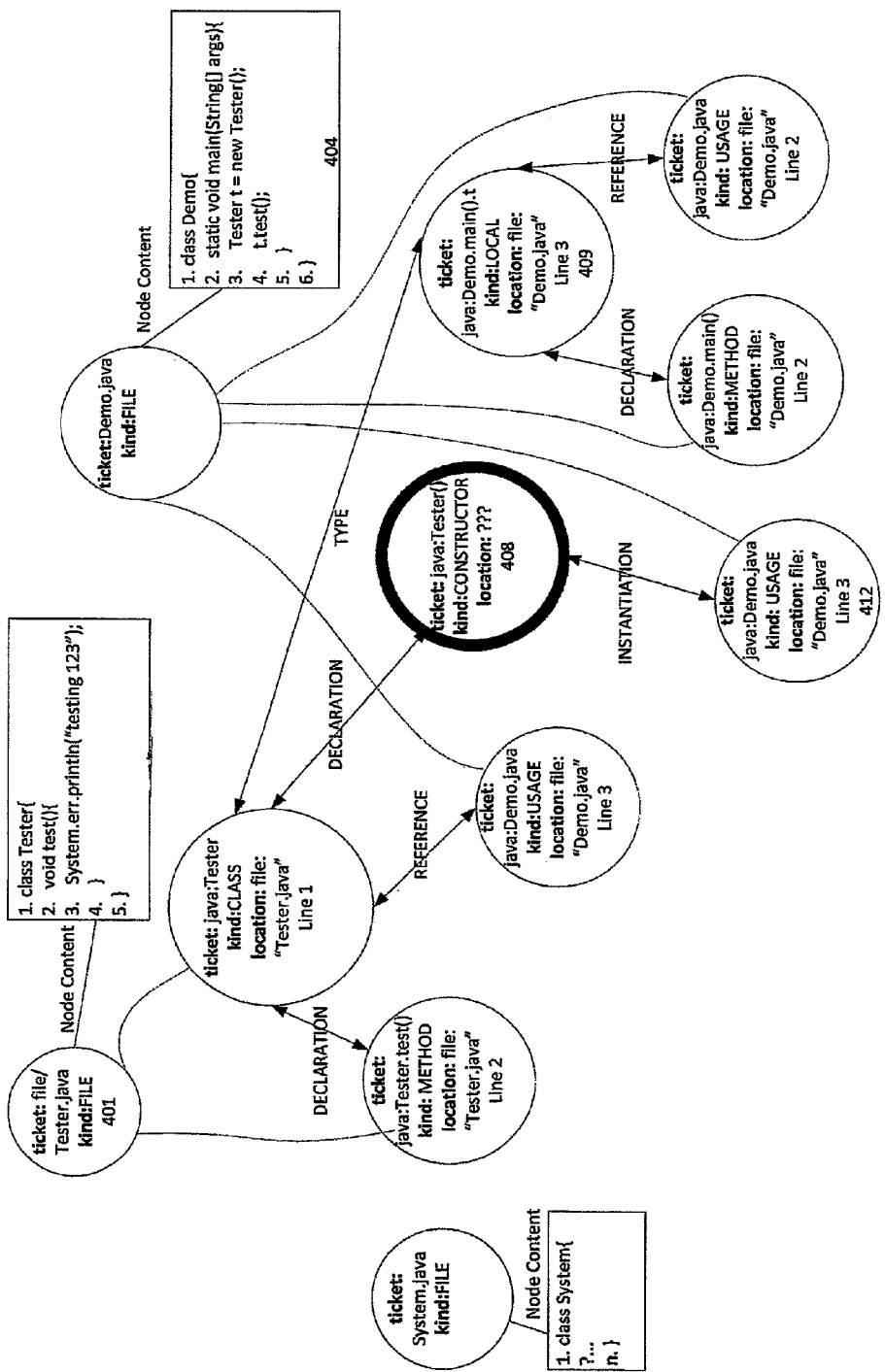
FIG. 4 is a block diagram illustrating a data model for the code segments defined in FIG. 3.

FIG. 4 is a partial implementation of a data graph model for the interaction between Demo.java( ) (305) and Tester.java( ) (303). As discussed above, nodes describe elements in the source code. In this example, each node has a unique identifier (ticket name) and a source location. The nodes are related via the labeled edges. When the call is made from Demo.java line 3 (409) to the Tester constructor (404, line 3), it is difficult to emit an edge between the usage of the constructor (412) and the constructor node (408) because there is no source location attached to the node which describes the constructor node (408).

Figure 5:
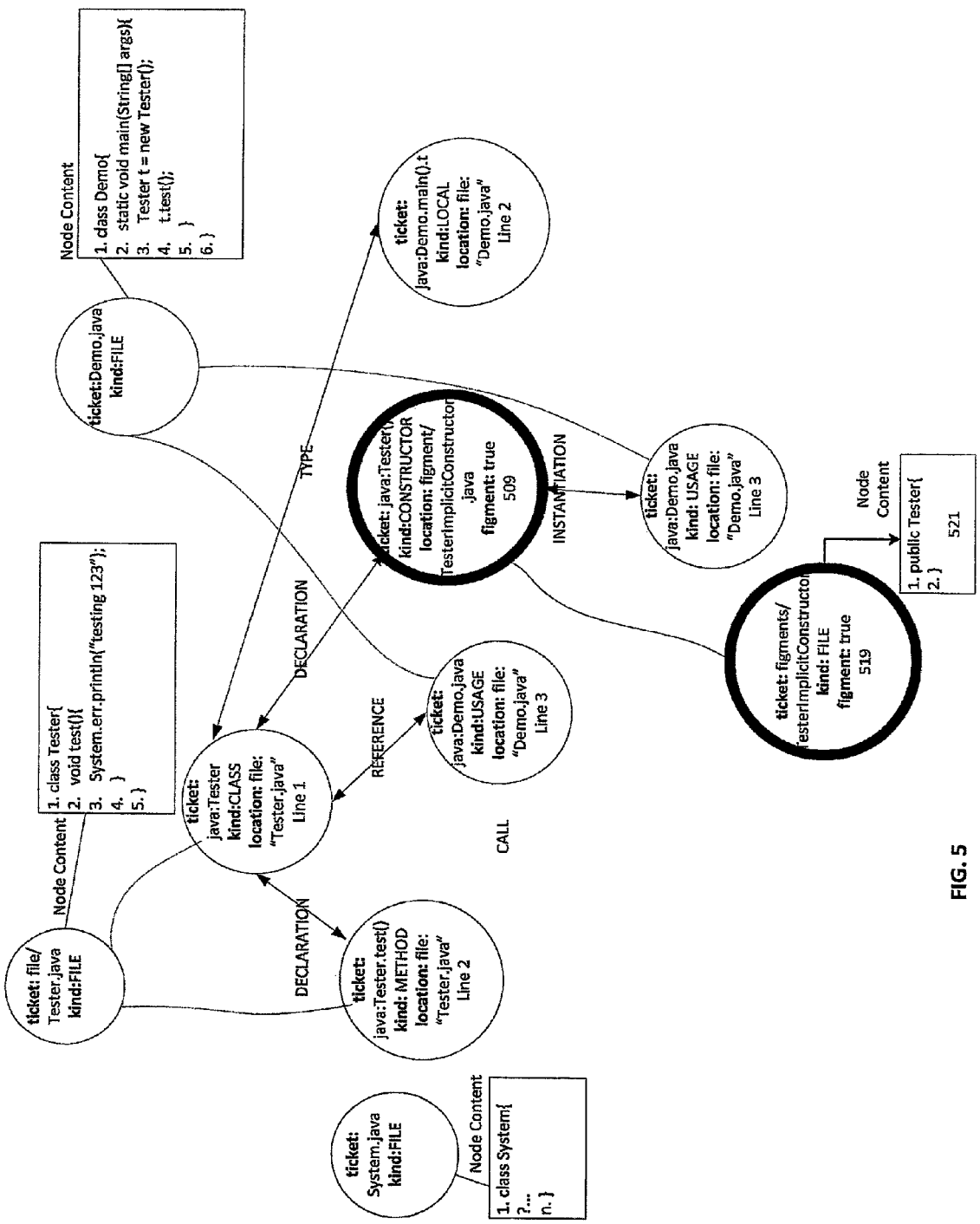
FIG. 5 is a block diagram illustrating an exemplary model for the code segments defined in FIG. 3 that includes code figments for hidden and/or implicit code.

In an exemplary data graph model such as the one illustrated in FIG. 5, a figment (519) is added to represent the implicit Tester constructor (521). This figment (519), which is a snippet of java code that may not be compilable on its own, contains enough information about the constructor for a user to understand the implicit code. The node describing the figment (519) is labeled with a special annotation such as "figment: true" as shown in the node, indicating that the node is a figment. The node describing the Tester constructor (509) is then modified to have the node's location point to the newly added figment.

Figure 6:
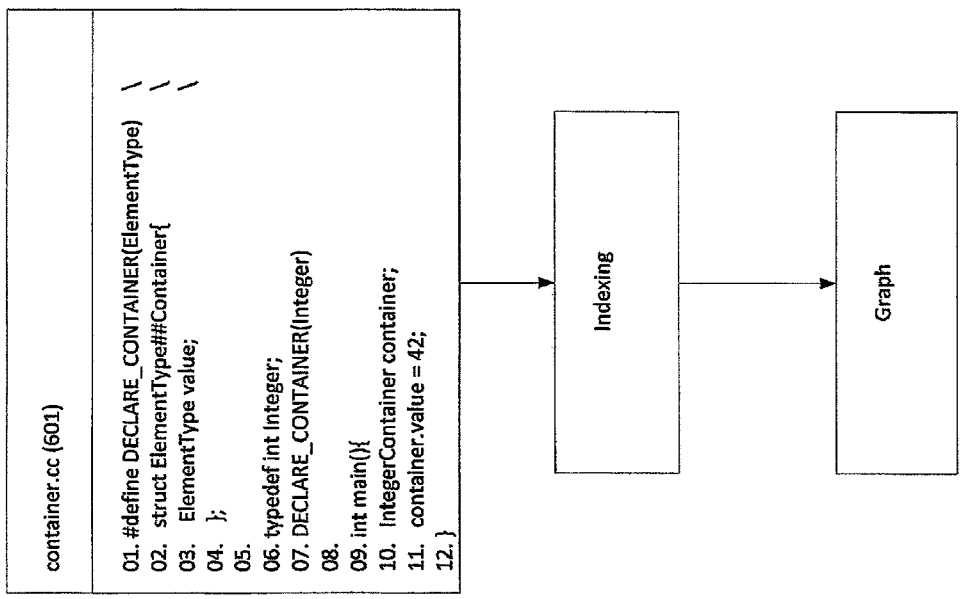
FIG. 6 is a block diagram illustrating an exemplary process of indexing and graphing a macro.

FIG. 6 illustrates an exemplary process for modeling a C++ file that defines and uses a macro (601). A macro is a rule or pattern that specifies how a certain input sequence should be mapped to a replacement input sequence according to a defined procedure.

Figure 7:
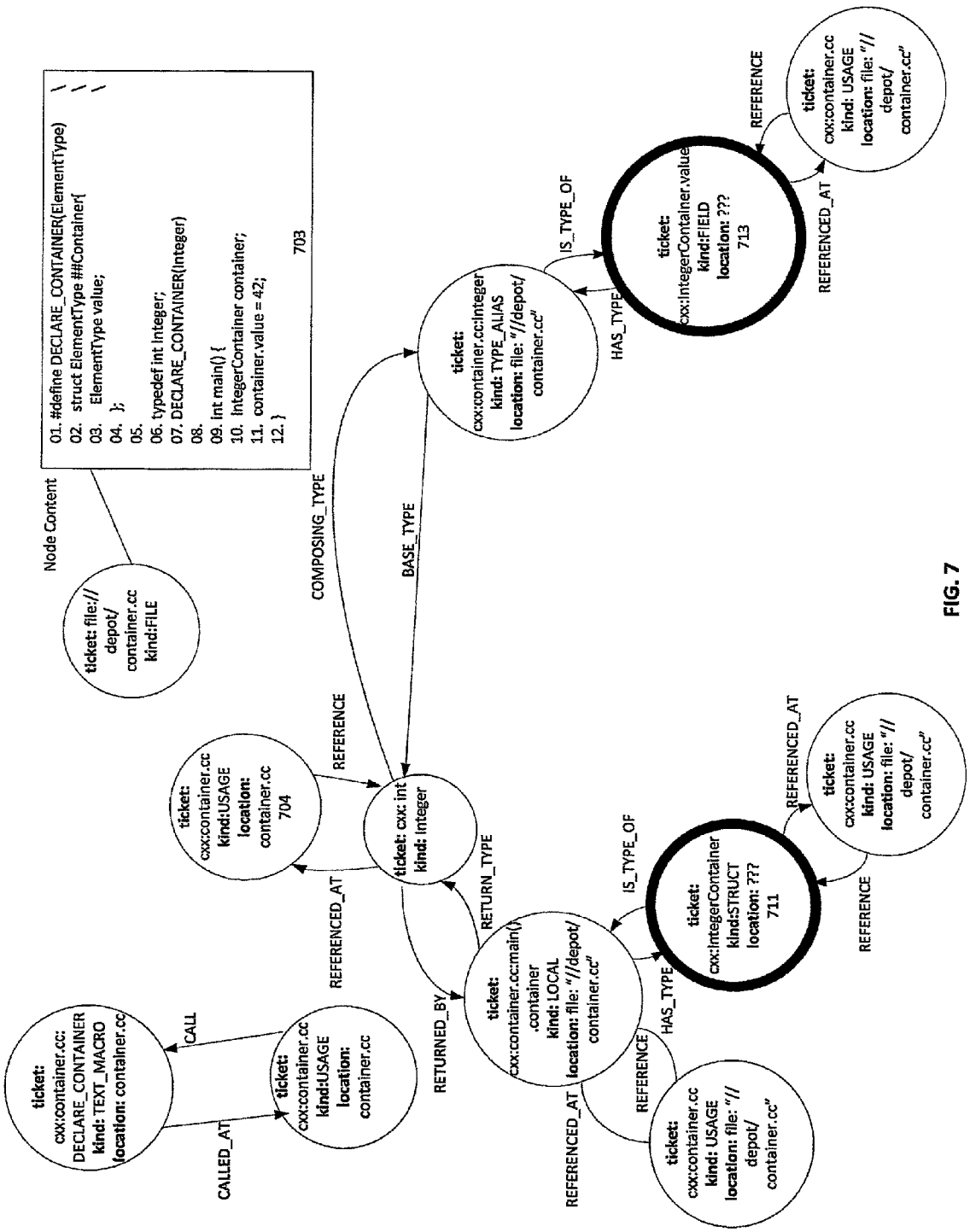
FIG. 7 is a block diagram illustrating a data model for the macro defined in FIG. 6.

FIG. 7 is a partial implementation of a data graph that can be created when indexing the source code of FIG. 6. In this graph, it is difficult to model the usage of "IntegerContainer" on line 10 (703) of the source code because a struct (704) has been introduced by the call to the macro (703) on line 7, but no actual source code for the definition of the struct exists. Additionally, the field value of the "IntegerContainer" type on line 11 (703) is hard to model since there is no actual source code for the "IntegerContainer." The "IntegerContainer" is put into the graph with a missing location (711). The value of the "IntegerContainer" is also incorporated into the graph without a location (713).

Figure 8:
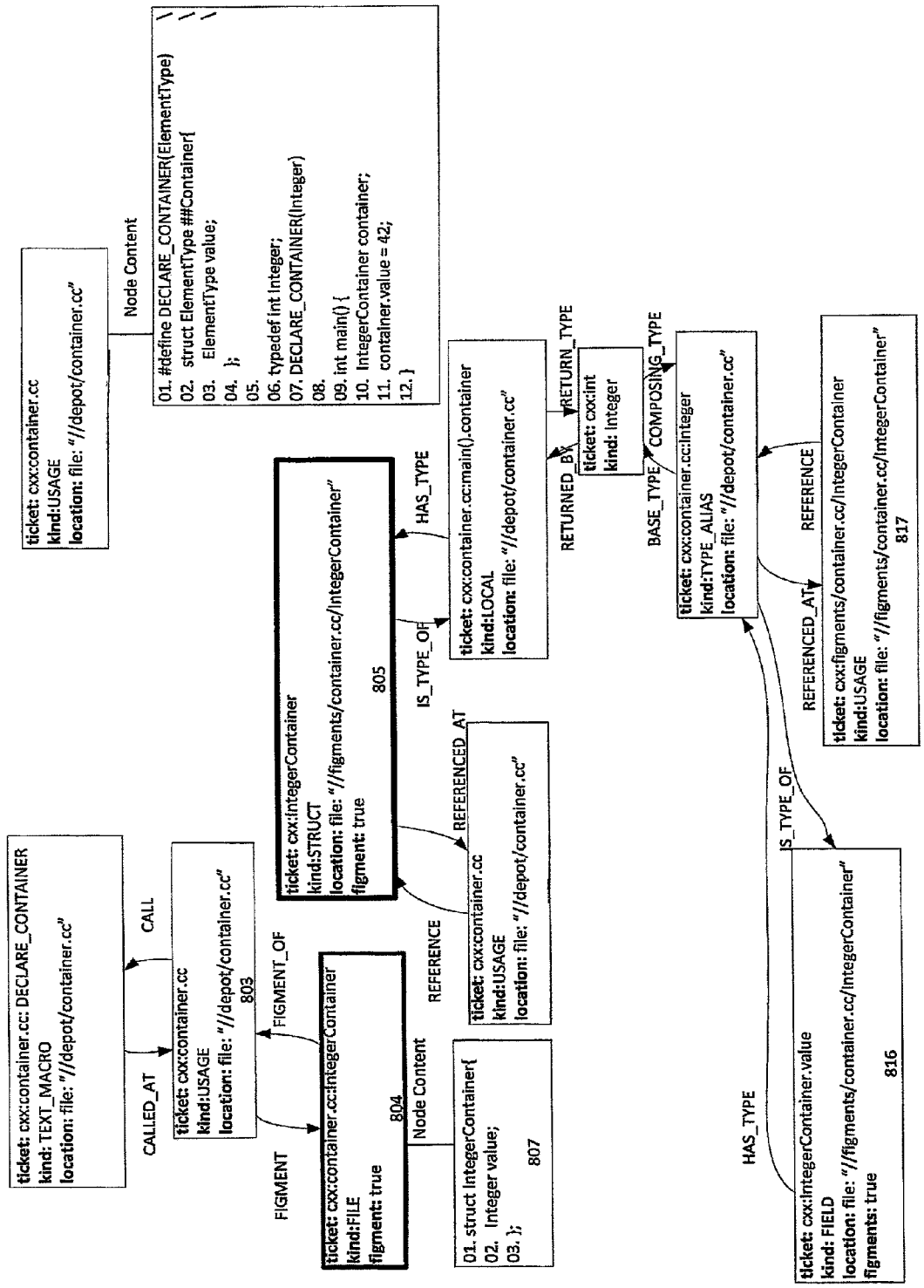
FIG. 8 is a block diagram illustrating an exemplary model for the macro defined in FIG. 6 that includes code figments for hidden and/or implicit code.

FIG. 8 shows an exemplary graph which creates a new file, "//figments/container.cc/IntegerContainer," (804) that contains the definition of the IntegerContainer struct (807). This new file (804) can then be used as the location information for both the node for the node representing the IntegerContainer STRUCT (805) as well as the node for the IntegerContainer value FIELD (816). Furthermore, a usage node (817) can be added between the type of the value field and the definition of the typedef in the original source file. Additionally, since the figment represents semantics that were created by a user action, there can be an edge created between the usage of the macro (803) and the figment file (804) which defines a "FIGMENT/FIGMENT_OF" relationship between these two nodes.

Location information may be any kind of information that is useful about the location of a code segment. Although location information in the figures is shown as a file and a line number, this information is illustrated merely for example purposes.

Figure 11:
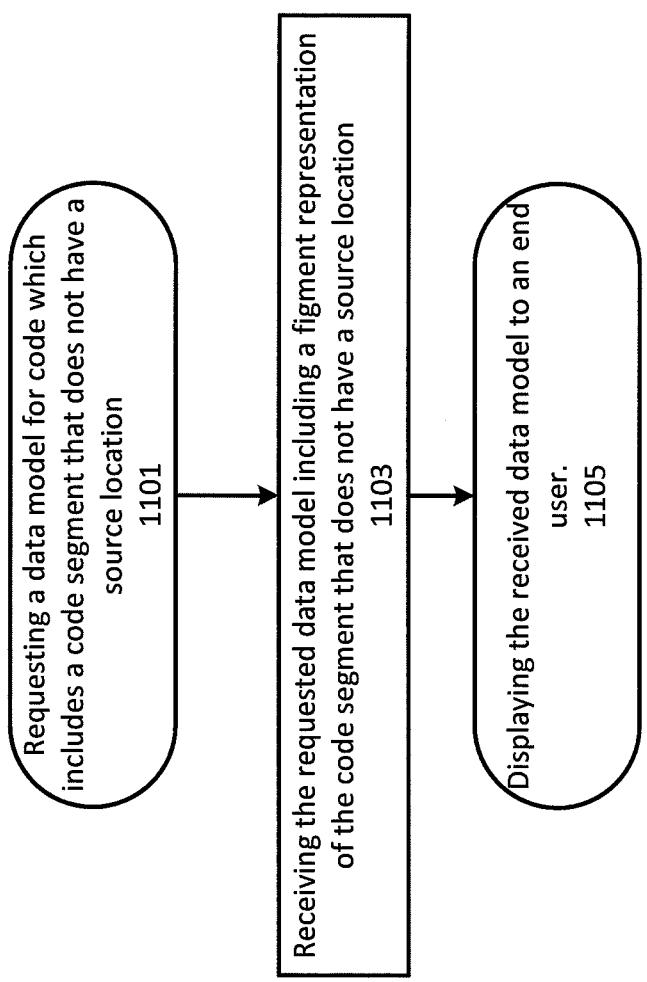
FIG. 11 is a flow diagram of an exemplary method for using a data model that represents a code segment which does not have a source location.

In an exemplary embodiment, coding tools and User Interfaces may use that data model enhanced with figments to represent code to an end user. An exemplary method for using a data model that represents a code segment which does not have a source location begins with requesting a data model as illustrated in FIG. 11 (1101). A data model may be requested using application programming interface (API) calls to an exemplary data graph model service. The received data model may contain at least one code segment that does not have a source location. The received data model may include a figment representation of the code segment that does not have a source location (1103). This data model may then be displayed to an end user (1105). In addition to a figment representation of a code segment that does not have a source location, the data model may contain metadata about the figment representation. This metadata may include a distinction between model nodes that are figments and those nodes that are not. The data model may also provide edge relationships between a node that contains a code segment without a source location and the node representing the code segment without a source location. The edge relationship may be modeled as a "FIGMENT_OF/HAS_FIGMENT" relationship. Code tools and user interfaces may use the metadata, edge relationships, and other provided information to determine what information to display to a user.

Figure 10:
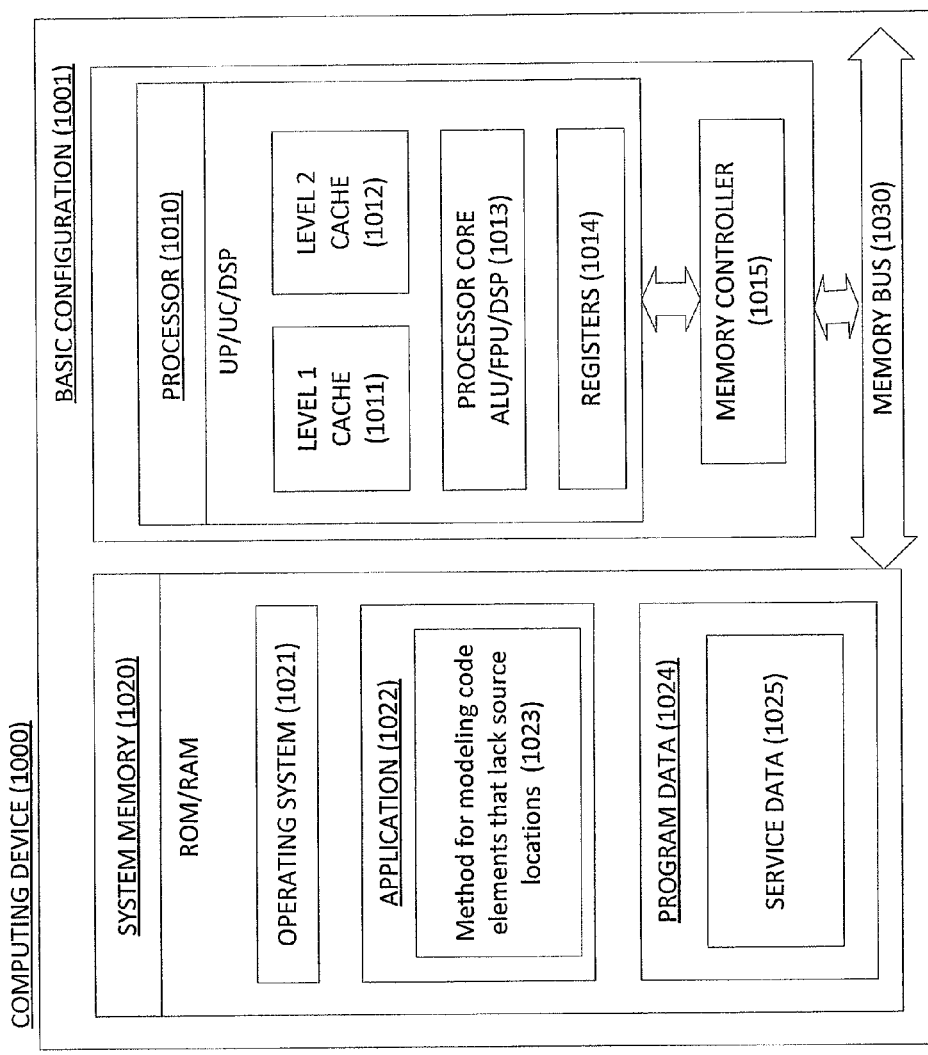
FIG. 10 is a block diagram illustrating an exemplary computing device.

FIG. 10 is a high-level block diagram of an exemplary computing device (1000) that is arranged for modeling code segments in a data model when the code segments do not have source locations. In a very basic configuration (1001), the computing device (1000) typically includes one or more processors (1010) and system memory (1020). A memory bus (1030) can be used for communicating between the processor (1010) and the system memory (1020).

Depending on the desired configuration, the processor (1010) can be of any type including but not limited to a microprocessor (µP), a microcontroller (µC), a digital signal processor (DSP), or any combination thereof. The processor (1010) can include one more levels of caching, such as a level one cache (1011) and a level two cache (1012), a processor core (1013), and registers (1014). The processor core (1013) can include an arithmetic logic unit (ALU), a floating point unit (FPU), a digital signal processing core (DSP Core), or any combination thereof. A memory controller (1016) can also be used with the processor (1010), or in some implementations the memory controller (1015) can be an internal part of the processor (1010).

Depending on the desired configuration, the system memory (1020) can be of any type including but not limited to volatile memory (such as RAM), non-volatile memory (such as ROM, flash memory, etc.) or any combination thereof. System memory (1020) typically includes an operating system (1021), one or more applications (1022), and program data (1024). The application (1022) may include a system for double filtering email annotations so that only annotations associated with actions that a user is likely to take are shown to a user. Program Data (1024) includes storing instructions that, when executed by the one or more processing devices, implement a system and method for parsing actionable items from email text and filtering these actionable items to only display those that a user is likely to act upon. (1023). Program data (1024) may also include service data (1025). In some embodiments, the application (1022) can be arranged to operate with program data (1024) on an operating system (1021).

The computing device (1000) can have additional features or functionality, and additional interfaces to facilitate communications between the basic configuration (1001) and any required devices and interfaces.

System memory (1020) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device (1000). Any such computer storage media can be part of the device (1000).

The computing device (1000) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (1000) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for modeling source code comprising:
    receiving source code including code segments that do not have a source location;
    indexing the received source code;
    creating a data model from the indexed source code that includes a plurality of nodes representing code elements and a plurality of edges for relationships between elements;
    determining the source location to be associated with each node;
    responsive to recognizing one of the code segments as a hidden or implicit code segment, creating a figment node for the code segment wherein the data model represents the figment's behavior with an edge between the figment node and a node representing the code element that contains the reference to the figment and wherein the figment node's content does not represent valid code syntax; and
    assigning the created figment as the source location associated with the code segment's node.

2. The method of claim 1 wherein a figment node is specially annotated to distinguish the node from other nodes in the data model.

3. The method of claim 1 further comprising providing the data model to a user.

4. The method of claim 3 wherein the data model is provided to a user via an API.

5. The method of claim 3 wherein the data model is provided to a user via a user interface.

6. The method of claim 3 wherein the data model is provided to a user via command line code.

7. The method of claim 1 wherein the data model includes a plurality of figment nodes and at least one figment node's content is valid code syntax.

8. A method for providing a source location to a node in a data model that represents a code segment that does not have a source location, comprising:
    responsive to recognizing the code segment as lacking a source location, creating a figment node for the code segment, wherein the data model represents the figment's behavior with an edge between the figment node and a node representing the code element that contains the reference to the figment and wherein the figment node's content does not represent valid code syntax; and
    assigning the created figment as the source location associated with the code segment's node.

9. A method for using a data model that represents a code segment that does not have a source location, comprising:
    requesting a data model for code which includes a code segment that does not have a source location;
    receiving the requested data model including a figment node of the code segment that does not have a source location, wherein the data model represents the figment's behavior with an edge between the figment node and a node representing the code element that contains the reference to the figment and wherein the figment node's content does not represent valid code syntax; and
optionally displaying the figment representation of the code segment to an end user.

10. The method of claim 9 wherein the received data model contains metadata about the figment representation.

11. The method of claim 10 wherein the metadata is used to show or hide the figment representation from the end user.

12. The method of claim 10 wherein the metadata is used to display information that a code segment is a figment.

13. The method of claim 10 wherein the metadata is used to display information that a code segment contains a figment.

14. The method of claim 9 wherein a data model is requested using an application programming interface.

15. A system for modeling source code comprising:
one or more processing devices and
one or more storage devices storing instructions that, when executed by the one or more processing devices, cause the one or more processing devices to:
receive source code including code segments that do not have a source location;
index the received source code;
create a data model from the indexed source code that includes a plurality of nodes representing code elements and a plurality of edges for relationships between elements;
determine the source location to be associated with each node;
responsive to recognizing one of the code segments as a hidden or implicit code segment, create a figment node for the code segment, wherein the data model represents the figment's behavior with an edge between the figment node and a node representing the code element that contains the reference to the figment and wherein the figment node's content does not represent valid code syntax; and
assign the created figment as the source location associated with the code segment's node.

16. The system of claim 15 wherein a figment node is specially annotated to distinguish the node from other nodes in the data model.

17. The system of claim 15 further comprising providing the data model to a user.

18. The system of claim 17 wherein the data model is provided to a user via an API.

19. The system of claim 17 wherein the data model is provided to a user via a user interface.

20. The system of claim 17 wherein the data model is provided to a user via command line code.

21. The system of claim 15 wherein the data model include a plurality of figment nodes and at least one figment node's.

* * * * *